United States Patent
Reith et al.

(10) Patent No.: US 7,010,204 B2
(45) Date of Patent: Mar. 7, 2006

(54) OPTICAL TRANSMISSION FIBER WITH THERMAL MANAGEMENT FOR HIGH-POWER APPLICATIONS

(75) Inventors: Leslie A. Reith, Berkeley Heights, NJ (US); Eva M. Vogel, Berkeley Heights, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 21 days.

(21) Appl. No.: 10/379,147

(22) Filed: Mar. 4, 2003

(65) Prior Publication Data
US 2004/0175086 A1 Sep. 9, 2004

(51) Int. Cl.
*G02B 6/02* (2006.01)

(52) U.S. Cl. .................................................. 385/128
(58) Field of Classification Search ............... 385/96, 385/128
See application file for complete search history.

(56) References Cited

U.S. PATENT DOCUMENTS

| | | | |
|---|---|---|---|
| 5,822,489 A | 10/1998 | Hale | |
| 5,864,644 A | 1/1999 | DiGiovanni et al. | |
| 6,198,868 B1 * | 3/2001 | Jang | 385/128 |

OTHER PUBLICATIONS

Percival, et al.; Catastrophic damage and accelerated ageing in bent fibres caused by high optical powers; IEE 2000; Electronics Letters; vol. 36, No. 5; Mar. 2, 2000; pp. 414-416.

* cited by examiner

*Primary Examiner*—John R. Lee
*Assistant Examiner*—Paul M. Gurzo

(57) ABSTRACT

An optical transmission fiber including a core having a first index of refraction, a cladding material located around the core and having a second index of refraction less than the first index of refraction, a first coating material located around a first portion of the cladding material and having a third index of refraction greater than the second index of refraction, and a second coating material located around a second portion of the cladding material and having a fourth index of refraction less than the second index of refraction.

7 Claims, 5 Drawing Sheets

OPTICAL TRANSMISSION FIBER WITH THERMAL MANAGEMENT FOR HIGH-POWER APPLICATIONS

TECHNICAL FIELD OF THE INVENTION

The present invention is directed, in general, to transmission fiberoptics and, more specifically, to an optical transmission fiber including thermal management for high-power applications.

BACKGROUND OF THE INVENTION

In general, an optical transmission fiber consists of a core, cladding around the core, and an exterior coating. Conventionally, the cladding has a refractive index that is less than a refractive index of the core, thereby confining an optical signal within the core. Similarly, the cladding often includes an exterior coating that has a higher refractive index than the cladding. Thus, the exterior coating allows any light energy that escapes the core to quickly exit the fiber rather than reentering the core or propagating as a cladding mode and interfering with the transmission signal propagating therein.

However, while such optical fibers have long been used, this design is not flawless. For example, in unidirectional applications, most junctions between two or more fibers generate coupling loss. In such conditions, the light energy not properly coupled into the downstream fiber core can be injected into the cladding of either the upstream or downstream fiber. For instance, a portion of the input light energy can be incident on the core/cladding interface at an angle less than the critical angle of incidence, as provided by Snell's Law. Upon such an occurrence, this light energy passes from the core and continues through the interface between the cladding and the coating, because the conventional coating has a higher index of refraction than that of the cladding. This light energy may be absorbed by the coating or any surrounding materials (e.g., cabling and packaging materials) and converted into heat energy. The heat energy can cause localized damage to the optical fiber and surrounding materials, which significantly reduces the operational life of the fiber. This is particularly consequential in high-power applications, such as but not limited to those where the transmission signal has a power above 0.5 W. In many cases, the surrounding material may have very poor thermal conduction characteristics, which compounds the damage caused by the light energy escaping the core, ultimately causing the optical fiber to fail prematurely. Of course, any optical components proximate the junction are also susceptible to the elevated temperatures.

Other applications that encourage such premature optical fiber failure include the use of bulk optics. More specifically, bulk optics packages typically require decoupling a signal from a package input fiber and processing the signal with the bulk optics components within the package. Thereafter, the processed signal is typically re-coupled to an output fiber. However, in such arrangements, coupling losses occur between the bulk optics components and/or the ends of the input/output fibers, such as those attributable to optical misalignment. Again, it is likely that this stray light energy will find its way into the cladding of the input or output fibers (pigtails) and cause the package and/or a localized portion of the optical fiber to overheat and fail prematurely.

Similarly, work-site obstructions, disadvantageous panel configurations and other installation/assembly obstacles may result in an optical transmission fiber to be permanently configured with a severe bend, such as one having a radius or kink smaller than about 10 mm. In such instances, the severe curvature of the fiber may cause signal energy propagating along the core to be injected into the cladding. Again, the escaping light energy is converted to heat upon leaving the cladding, which can overheat a localized portion of the optical transmission fiber, resulting in premature failure.

Accordingly, what is needed in the art is an optical transmission fiber that overcomes the above-discussed problems experienced by conventional optical transmission fibers.

SUMMARY OF THE INVENTION

To address the above-discussed deficiencies of the prior art, the present invention provides an optical transmission fiber including a core, a cladding material located around the core, and first and second coating materials around the cladding material. The first coating material is located around a first portion of the cladding material and has an index of refraction greater than an index of refraction of the cladding material. The second coating material is located around a second portion of the cladding material and has an index of refraction less than the index of refraction of the cladding material.

The foregoing has outlined an embodiment of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

The present invention is best understood from the following detailed description when read with the accompanying FIGUREs. It is emphasized that in accordance with the standard practice in the optics industry, various features may not be drawn to scale. In fact, the dimensions of the various features may be arbitrarily increased or reduced for clarity of discussion. Reference is now made to the following descriptions taken in conjunction with the accompanying drawings, in which.

DETAILED DESCRIPTION

Figure 1:
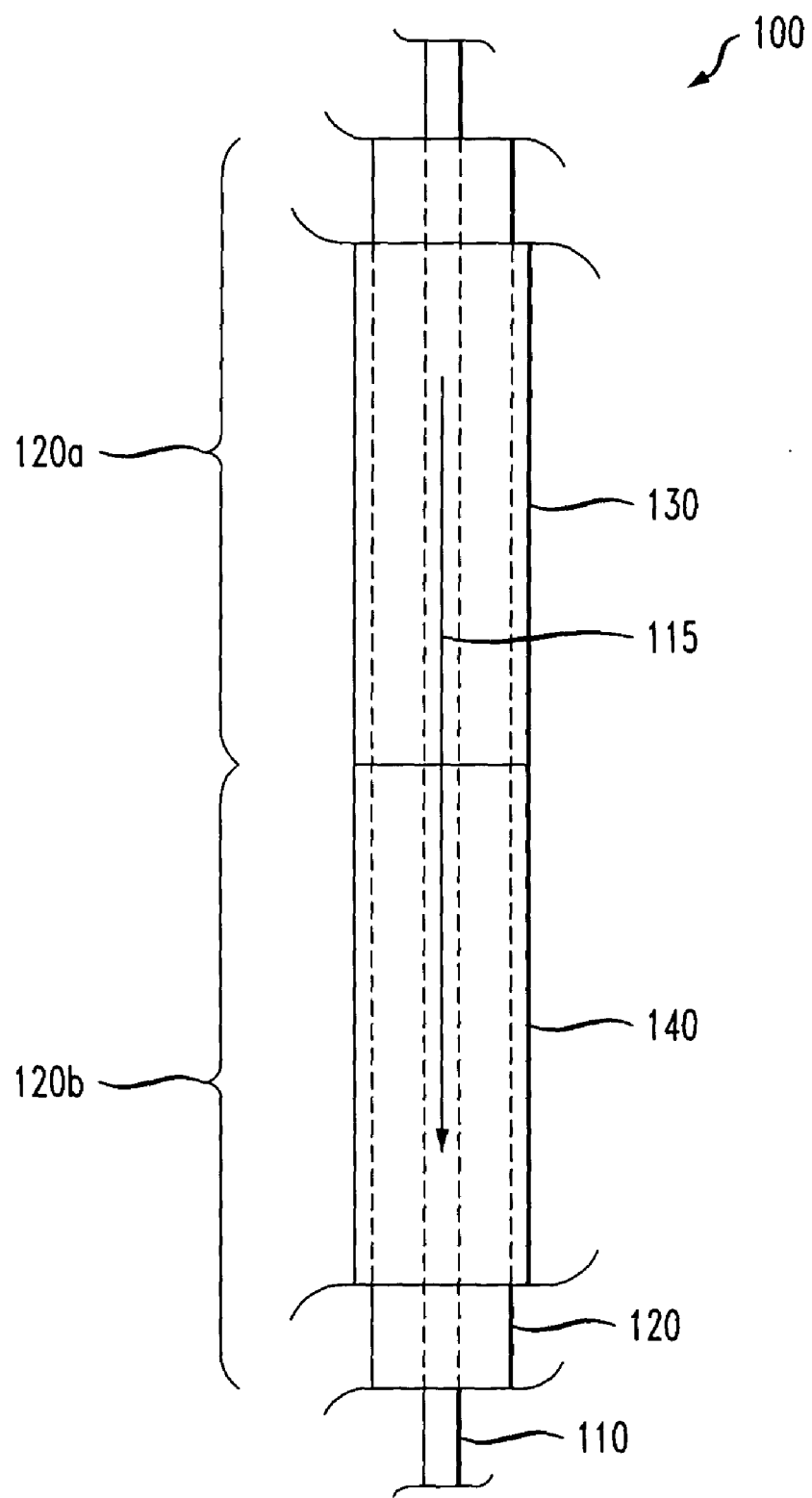
FIG. 1 illustrates a plan view of an embodiment of an optical transmission fiber constructed according to the principles of the present invention.

Referring initially to FIG. 1, illustrated is a plan view of an embodiment of an optical transmission fiber 100 constructed according to the principles of the present invention. The optical transmission fiber 100 includes a core 110 and a cladding material 120 located around the core 110. The core 110 and cladding material 120 may be of conventional materials and construction. As such, the cladding material 120 has an index of refraction that is less than an index of refraction of the core 110, such that a transmission signal (light energy) propagating along the core 110 is substantially confined within the core 110. As shown in FIG. 1, the transmission signal propagates within the core 110 in the general direction of the arrow 115.

The optical transmission fiber 100 also includes a first coating material 130 located around a first portion 120a of the cladding material 120. The first coating material 130 may also be of conventional materials and construction. The first coating material 130 has an index of refraction that is greater than the index of refraction of the cladding material 120, such that any light energy that escapes the core 110 into the cladding material 120 may quickly exit the cladding material 120 through the first coating material 130. As known to those skilled in the art, light energy may escape the optical transmission fiber 100 as light energy, or it may be at least partially converted to heat energy within the coating material 130 and radiate to the ambient environment. In many applications, the energy escaping the optical transmission fiber 100 in this manner can be deleterious to materials surrounding the optical transmission fiber 100, and subsequently to the optical transmission fiber 100 itself, as discussed above and further described below. Those skilled in the art will also recognize that additional coatings (not shown) may be formed on the first coating material 130.

The optical transmission fiber 100 also includes a second coating material 140 located around a second portion 120b of the cladding material 120. The second coating material 140 is substantially not located over the first coating material 130 but, as those skilled in the art will understand, the second coating material 140 may have additional coatings (not shown) formed thereon. The second coating material 140 has an index of refraction that is less than the index of refraction of the cladding material 120, such that any light energy that escapes the core 110 into the cladding material 120 is confined within the cladding material 120. Accordingly, the energy confined within the cladding material 120 may be guided to a downstream location where it is more desirable to extricate the energy, as will be described below. The second coating material 140 may comprise commercially available materials having an index of refraction less than the index of refraction of the cladding material 120. An exemplary coating is disclosed in co-assigned U.S. Pat. No. 5,822,489 to Hale, which is incorporated herein by reference.

Figure 2:
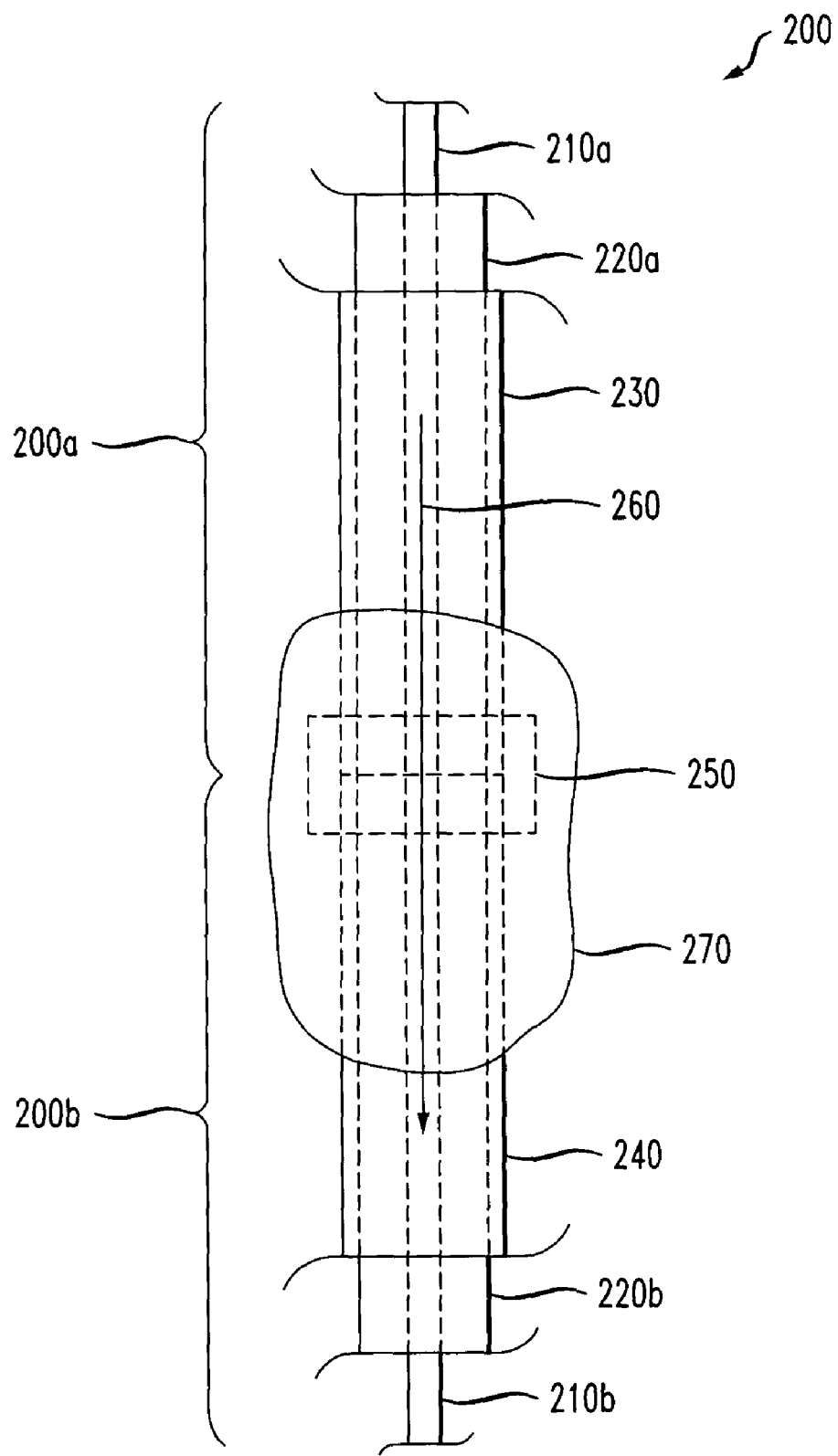
FIG. 2 illustrates a plan view of another embodiment of an optical transmission fiber constructed according to the principles of the present invention.

Turning to FIG. 2, illustrated is a plan view of another embodiment of an optical transmission fiber 200 constructed according to the principles of the present invention. The optical transmission fiber 200 includes a first fiber portion 200a and a second fiber portion 200b. The first fiber portion 200a includes a first core portion 210a, a first cladding material portion 220a around the first core portion 210a, and a first coating material 230 around the first cladding material portion 220a. As with the optical transmission fiber 100 shown in FIG. 1, the first coating material 230 has an index of refraction that is greater than an index of refraction of the first cladding material portion 220a. The second fiber portion 200b includes a second core portion 210b, a second cladding material portion 220b and a second coating material 240 around the second cladding material portion 220b. The first and second core portions 210a, 210b, the first and second cladding material portions 220a, 220b, and the first and second coating materials 230, 240 may have the same materials and construction as the related features shown in FIG. 1. Accordingly, the second coating material 240 has an index of refraction that is less than an index of refraction of the second cladding material portion 220b.

The optical transmission fiber 200 also includes an optical device 250. The optical device 250 may be any conventional device that can be used to join two fibers end-to-end. For example, the optical device 250 may be a fusion splice, optical connector or other optical coupler that joins two fiber terminations without altering a transmission signal propagating therethrough. Those skilled in the art understand that there are myriad other optically passive or transparent means for joining two fibers end-to-end within the scope of the present invention.

Those skilled in the art also understand that junctions between optical transmission fibers and/or optical components typically include one or more types of surrounding material, fusion splice protectors, protector sleeves or connector ferrules exterior to the junction to provide mechanical robustness and environmental protection. Such surrounding material 270 is generally indicated in FIG. 2.

As a transmission signal passes from the first core portion 210a to the second core portion 210b through the optical device 250, any misalignment between the core portions 210a, 210b can cause coupling losses. Of course, other factors may also influence the coupling efficiency of the junction between the core portions 210a, 210b and the optical device 250. The light energy that fails to couple to the second core portion 210b may be injected into the cladding material portions 220a, 220b.

The light energy entering the first cladding material portion 220a will quickly diffuse out of the first fiber portion 200a because the first coating material 230 has a higher index of refraction that the first cladding material portion 220a. It has presently been recognized that as the stray light energy passes through the first coating material 230 and the surrounding material 270, the light energy will at least partially convert to heat energy. It has also been presently recognized that in high-power applications the excessive heat energy resulting from the poor coupling of the light energy to the core (210a, 210b) damages the transmission fiber, which can result in catastrophic failure of the fiber long before the fiber's design life. Moreover, because coupling losses and other factors leading to the injection of light into the cladding portion of a transmission fiber frequently occur proximate or within optical components (e.g., bulk optics packages and modulators), the excessive heat can damage or destroy the optical components in addition to the transmission fiber.

Returning to FIG. 2, coupling losses and other factors may also cause stray light energy to be injected into the second cladding material portion 220b. However, because the second coating material 240 has an index of refraction that is less than that of the second cladding material portion 220b, the stray light energy is confined within the second cladding material portion 220b. Accordingly, the unwanted energy may be guided downstream (in the direction of arrow 260) to a location where extraction is more desirable. Exemplary means for such extraction is more fully discussed below.

Figure 3:
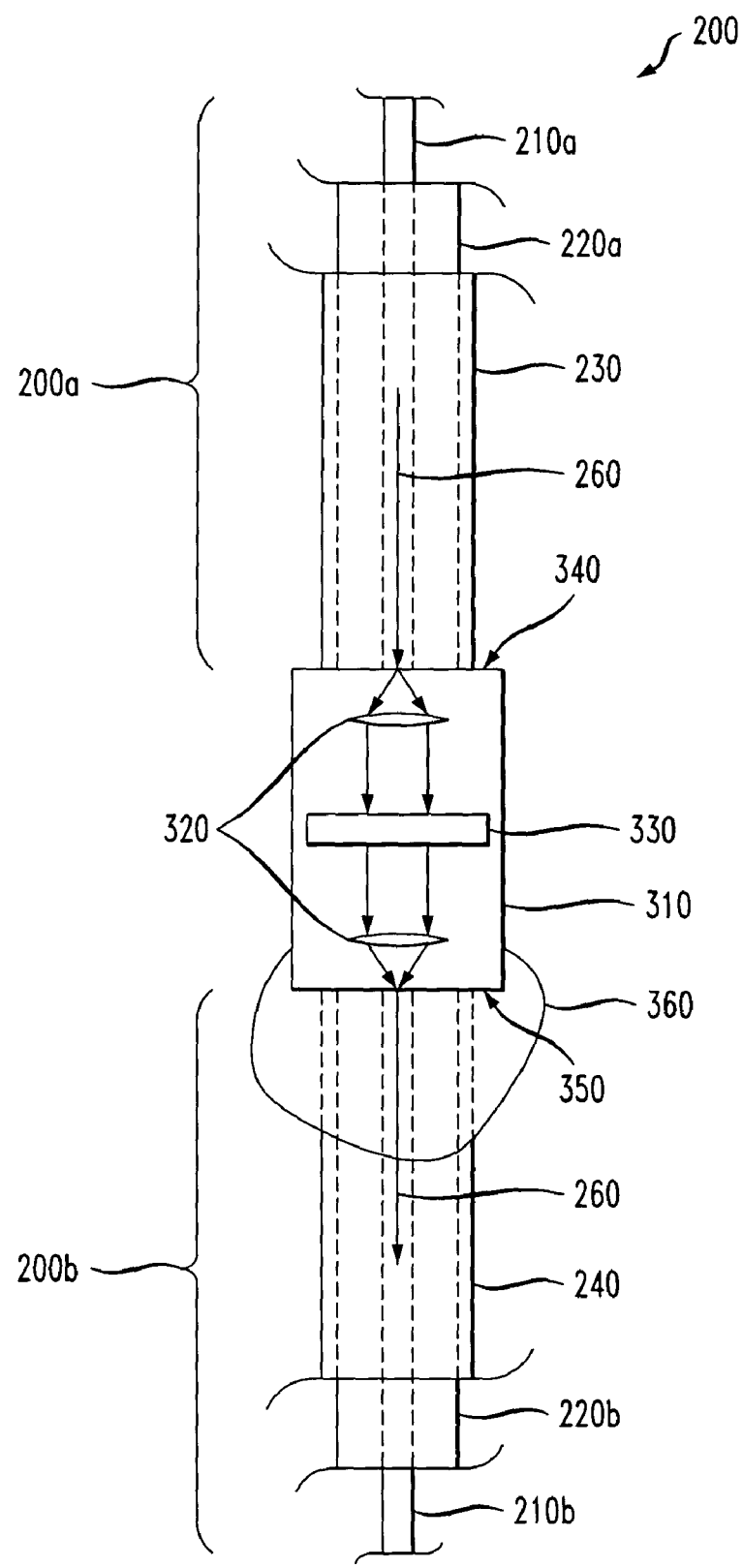
FIG. 3 illustrates a plan view of yet another embodiment of an optical transmission fiber constructed according to the principles of the present invention.

Turning to FIG. 3, illustrated is a plan sectional view of another embodiment of the optical transmission fiber 200 shown in FIG. 2. However, in the embodiment shown in FIG. 3, an active optical device 310 couples the first and second fiber portions 200a, 200b instead of the optically transparent optical device 250 shown in FIG. 2. The active optical device 310 intentionally alters the transmission signal propagating in the general direction of the arrow 260. For example, the optical device 310 may be an amplifier, a modulator, a bulk optics package or its components, a multiplexer or a tapered-fiber bundle. In the particular embodiment shown, the optical device 310 is a conventional bulk optics package that may comprise coupling optics 320 (e.g., lenses and/or collimators) and an active optical component 330 (e.g., an isolator or filter). The first fiber portion 200a is optically coupled to an input 340 of the optical device 310 and the second fiber portion 200b is optically coupled to an output 350 of the optical device 310.

Those skilled in the art understand that optically transparent couplings are often difficult to achieve, even with embodiments similar to the embodiment shown in FIG. 2. For example, coupling losses can arise from any misalignment of the joined fiber ends or optical components. As a result, stray light energy may be undesirably injected into the cladding portion of a transmission fiber. With conventional transmission fibers, the exterior coating material has an index of refraction that is greater than the index of refraction of the cladding, such that the stray energy in the cladding passes to and through the exterior coating material. The coating material and any material exterior thereto (such as surrounding material 360) then absorbs the light energy and converts it into heat. As discussed above, the excessive heat can cause severe damage to the transmission fiber and surrounding optical components (such as optical device 310) and cause the fiber and/or components to fail long before their design lives, especially in today's high-power applications.

Figure 4:
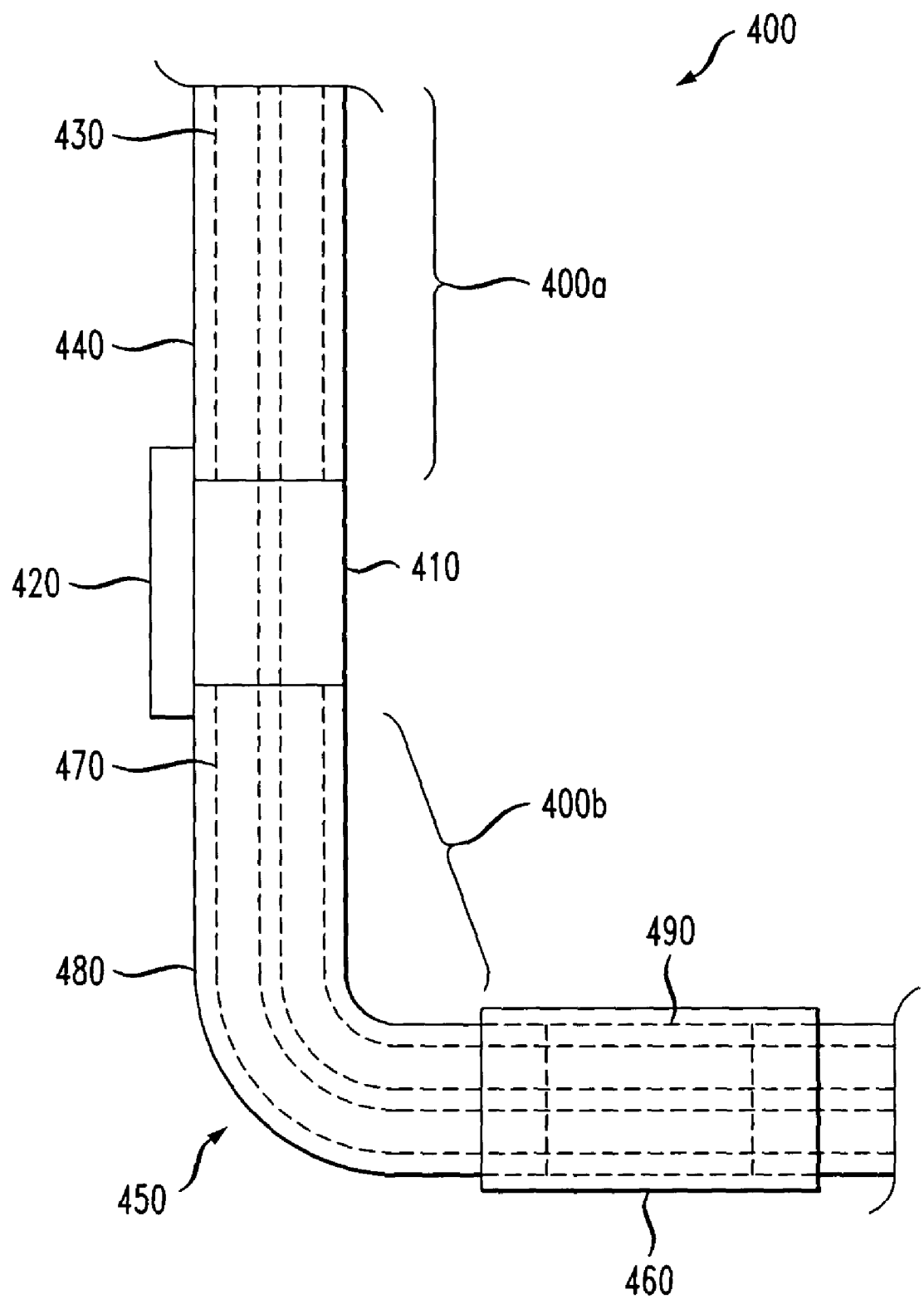
FIG. 4 illustrates a plan view of yet another embodiment of an optical transmission fiber constructed according to the principles of the present invention.

Turning to FIG. 4, illustrated is a plan view of another embodiment of an optical transmission fiber 400 constructed according to the principles of the present invention. The optical transmission fiber 400 includes a first fiber portion 400a, a mode stripper 410, a heat sink 420 and a second fiber portion 400b. The first fiber portion 400a may be similar to the second fiber portions 200b shown in FIGS. 2 and 3. Accordingly, the first fiber portion 400a includes a cladding portion 430 and a coating material 440, the coating material 440 having an index of refraction that is less than an index of refraction of the cladding portion 430.

The mode stripper 410, which may be a conventional device, decouples light energy propagating in the cladding portion 430 and directs the light energy away from the fiber 400. For example, the mode stripper 410 may direct the unwanted light energy into the heat sink 420, where the light energy may be converted into heat energy and radiated into the ambient environment. The heat sink 420 may comprise a thermally conductive metal or other materials capable of withstanding high temperatures and configured to radiate or otherwise disperse heat energy into the ambient environment. In one embodiment, the heat sink 420 may merely comprise the air in the ambient environment.

The mode stripper 410 and heat sink 420 are located distal from any optical components (such as the optical device 250 shown in FIG. 2 or the optical device 310 shown in FIG. 3), such that the dispersed heat does not damage the optical components. Moreover, because the heat energy is extracted by the mode stripper 410 and/or heat sink 420, which are designed to accommodate high temperatures, the transmission fiber 400 is not damaged by the heat energy. Thus, by effective thermal management within the transmission fiber 400, the integrity of the fiber 400 is maintained despite the partial injection of the high-powered transmission signal into the cladding portion 430.

As shown in the embodiment illustrated in FIG. 4, the optical transmission fiber 400 may also include a fiber portion 400b that includes a curved portion or bend 450 having a radius or kink smaller than about 10 mm. Those skilled in the art understand that while conventional installation procedures generally advise against such bends, these bends are sometimes unavoidable, such as in the confined space of conventional switching panels. One reason the tight bends in conventional transmission fibers are avoided is that the angle of incidence of the transmission signal propagating therethrough can become less than the critical angle of incidence, such that a portion of the transmission signal may be injected into the cladding material. As discussed above, the high-powered light energy propagating within the cladding material can result in excessive temperatures in and around the fiber. The excessive temperatures are particularly undesirable considering that bends such as the bend 450 shown in FIG. 4 are typically located proximate optical components that are not designed to withstand excessive temperatures.

To prevent excessive heating of the fiber 400, the embodiment shown in FIG. 4 also includes a second heat sink 460 downstream of the bend 450. The second fiber portion 400b also includes cladding material 470 and a coating material 480, wherein the coating material 480 has an index of refraction that is less than an index of refraction of the cladding material 470. Due to the lower index refraction of the coating material 480, the light energy injected into the cladding material 470 at the bend 450 is guided downstream to the heat sink 460. The heat sink 460 may comprise a thermally conductive compound, such as RTV silicon. Moreover, a portion 490 of the coating under the heat sink 460 may have an index of refraction that is greater than the index of refraction of the cladding material 470 thereunder, thereby allowing energy to pass from the cladding 470 to the heat sink 460. The light energy escapes the second fiber portion 400b into the heat sink 460, where it is converted into heat energy and dissipated into the ambient environment. Of course, those skilled in the art understand that the heat sink 420 in the first fiber portion 400a and the heat sink 460 in the second fiber portion 400b are in general, interchangeable devices, and that other heat dissipation means are also within the scope of the present invention.

Thus, the present invention provides means for guiding light energy undesirably injected into the cladding portion of an optical transmission fiber to a location where it is more desirable to remove the light energy. Accordingly, critical portions of the transmission fiber and/or optical components may be located distal from any damaging temperatures. More specifically, the present invention provides a portion of an optical transmission fiber with a coating that has a lower index of refraction that the underlying cladding material. The coating confines the stray light energy within the cladding material until the light energy can be safely removed without damaging the optical transmission fiber or optical components coupled thereto. The present invention also provides means for effectively removing the stray light energy by at least partially converting it into heat energy and dissipating the heat energy by a mode stripper and/or heat sink, which may comprise air or other thermally conductive materials. Accordingly, optical transmission fibers constructed according to the principles of the present invention are protected from the high temperatures arising from the injection of high-powered transmission signals into the cladding material.

While optical fibers comprising a coating having a refractive index that is less than the refractive index of the cladding do currently exist, such fibers are only used on cladding-pumped fiber amplifiers and lasers, such as those used in conjunction with tapered fiber bundles. The coating having a lower refractive index than that of the cladding material is used to confine signals from pump diodes intentionally injected directly into the cladding. However, such coatings do not presently exist in transmission optic fiber. In fact, it is counter-intuitive to those skilled in the art to employ such a lower refractive index coating on optical transmission fibers, such as those of the present invention, because it is desirable to allow any light energy escaping the core of an optical transmission fiber to exit the cladding as quickly as possible to avoid any interference between this "lost" energy and the remaining signal energy propagating in the core or cladding.

Figure 5:
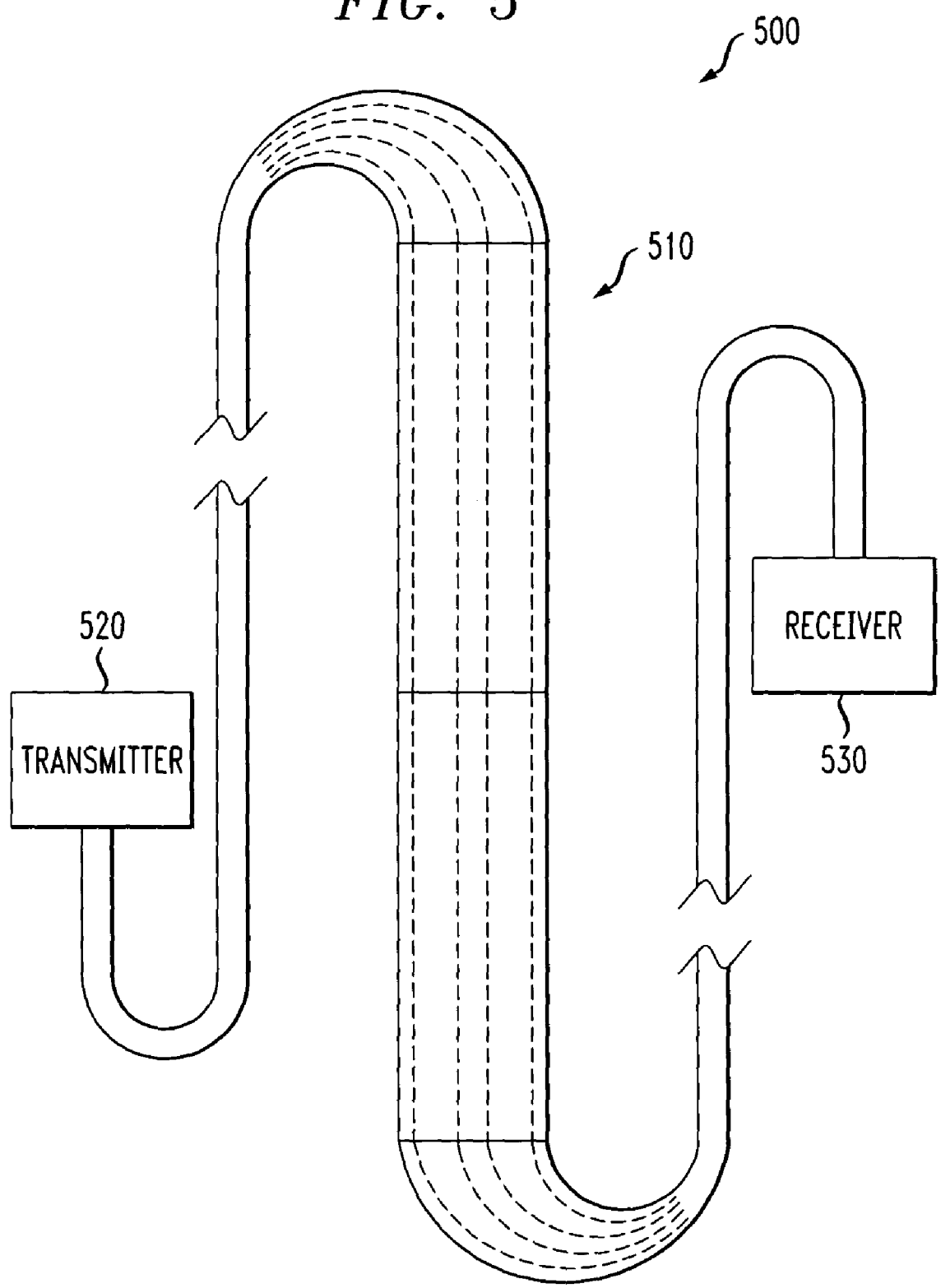
FIG. 5 illustrates a plan view of an embodiment of an optical transmission system constructed according to the principles of the present invention.

Turning briefly to FIG. 5, illustrated is a plan view of an embodiment of an optical transmission system 500 constructed according to the principles of the present invention. The optical transmission system 500 includes an optical transmission fiber 510, which may be similar to the optical transmission fiber 100 shown in FIG. 1, the optical transmission fiber 200 shown in FIG. 2 or 3, the optical transmission fiber 400 shown in FIG. 4, or a combination thereof. The optical transmission system 500 also includes a transmitter 520 and a receiver 530 coupled together by the optical transmission fiber 510. The transmitter 520 and receiver 530 may be directly coupled by the optical transmission fiber 510. In other embodiments, the transmitter 520 and receiver 530 may be indirectly coupled by the optical transmission fiber 510, such that addition optical fibers or components may also be coupled between the transmitter 520 and receiver 530.

Although certain embodiments of the present invention have been described in detail, those skilled in the art should understand that they can make various changes, substitutions and alterations to those embodiments without departing from the spirit and scope of the invention.

What is claimed is:

1. An optical transmission fiber, comprising:
   a core having a first index of refraction;
   a cladding material located around said core and having a second index of refraction less than said first index of refraction;
   a first coating material located around a first portion of said cladding material and having a third index of refraction greater than said second index of refraction; and
   a second coating material located around a second portion of said cladding material and having a fourth index of refraction less than said second index of refraction, said second coating material substantially confining light energy escaping from said core within said second portion of said cladding material for transmission to an energy removal location.

2. The optical transmission fiber as recited in claim 1 wherein said first portion is optically coupled to an input of an optical device and said second portion is optically coupled to an output of said optical device.

3. The optical transmission fiber as recited in claim 2 wherein said optical device is configured to transmit a transmission signal carried by said transmission fiber without altering said transmission signal.

4. The optical transmission fiber as recited in claim 2 wherein said optical device is configured to alter a transmission signal carried by said transmission fiber.

5. The optical transmission fiber as recited in claim 4 wherein said optical device is an amplifier, a modulator, a bulk optics package, a multiplexer, a fusion splice or an optical coupler.

6. The optical transmission fiber as recited in claim 1 wherein said transmission fiber includes a curved portion wherein said second coating material extends over at least a portion of said curved portion.

7. The optical transmission fiber as recited in claim 1 further including a heat sink coupled to said second coating material such that said heat sink removes energy from said optical transmission fiber.

* * * * *

UNITED STATES PATENT AND TRADEMARK OFFICE
CERTIFICATE OF CORRECTION

PATENT NO. : 7,010,204 B2 Page 1 of 1
APPLICATION NO. : 10/379147
DATED : March 7, 2006
INVENTOR(S) : Leslie A. Reith and Eva M. Vogel It is certified that error appears in the above-identified patent and that said Letters Patent is hereby corrected as shown below:

At Column 1, after Title and before line 5, please insert the following:

-- ACKNOWLEDGEMENT OF GOVERNMENT SUPPORT

The invention was made with United States government support. The United States government has certain rights in this application and patents issued therefrom. --

Signed and Sealed this

Sixth Day of January, 2009

JON W. DUDAS
*Director of the United States Patent and Trademark Office*